(12) United States Patent
Chau et al.

(10) Patent No.: US 11,900,401 B2
(45) Date of Patent: *Feb. 13, 2024

(54) SYSTEMS AND METHODS FOR TAILORING MARKETING

(71) Applicant: American Express Travel Related Services Company, Inc., New York, NY (US)

(72) Inventors: Lee Chau, New York, NY (US); Tirthankar Choudhuri, Gurgaon (IN); Ajay Choudhary, Gurgaon (IN); Vikas Grover, Ambala Cantt (IN); Mohd Arshad Naeem, Gurgaon (IN); Subhajit Sanyal, Bangalore (IN); Dawn Thomas, Kew Gardens, NY (US); Amit Jagdish Agarwal, Bangalore (IN); Pranav Mehta, Gurgaon (IN); Kamal Gupta, Bangalore (IN); Subhra Purkayastha, Gurgaon (IN); Prakruthi Prabhakar, Cuddalore (IN)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,668

(22) Filed: May 9, 2023

(65) Prior Publication Data

US 2023/0306452 A1    Sep. 28, 2023

Related U.S. Application Data

(63) Continuation of application No. 16/748,451, filed on Jan. 21, 2020, now Pat. No. 11,710,140, which is a
(Continued)

(51) Int. Cl.
*G06Q 30/00* (2023.01)
*G06Q 30/0204* (2023.01)
(Continued)

(52) U.S. Cl.
CPC ..... *G06Q 30/0204* (2013.01); *G06Q 30/0254* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 2007/0094066 A1* | 4/2007 | Kumar | G06Q 10/04 706/61 |
| 2009/0119167 A1 | 5/2009 | Kendall et al. | |

(Continued)

FOREIGN PATENT DOCUMENTS

| | | |
|---|---|---|
| CA | 2695794 A1 | 2/2009 |
| WO | 2009061617 A1 | 5/2009 |
| WO | 2015085326 A1 | 6/2015 |

OTHER PUBLICATIONS

Robin, Donald; et al. "Estimating the Causal Effects of Marketing Interventions Using Propensity Score Methodology." Statistical Science 21.02 (2006): 206-222.

*Primary Examiner* — Michael Bekerman
(74) *Attorney, Agent, or Firm* — Thomas | Horstemeyer, LLP

(57) ABSTRACT

The present disclosure presents systems and related methods for creating real-time predictions. One such method comprises receiving, by a computing device, a first set of data and a second set of data, wherein the first set of data comprises a plurality of items available from a first source for a first set of users and the second set of data comprises transaction purchase data for a second set of users that have reward accounts, utilizing a predictive data model that
(Continued)

determines a propensity score for a user from only behavior data that is not attributed to the user; receiving a third set of data from a third source comprising social media channel data for a third set of users; and updating the predictive data model to determine the propensity score for the user based at least in part on the third set of data.

20 Claims, 2 Drawing Sheets

Related U.S. Application Data continuation of application No. 14/961,614, filed on Dec. 7, 2015, now abandoned.

(60) Provisional application No. 62/205,580, filed on Aug. 14, 2015.

(51) Int. Cl.
   *G06Q 30/0251*   (2023.01)
   *G06Q 30/0601*   (2023.01)

(56) References Cited

U.S. PATENT DOCUMENTS

| | | |
|---|---|---|
| 2011/0010324 A1 | 1/2011 | Bolivar et al. |
| 2011/0035288 A1 | 2/2011 | Clyne |
| 2011/0087531 A1 | 4/2011 | Winters et al. |
| 2011/0178855 A1* | 7/2011 | Rane ............... G06Q 30/0254 |
| | | 707/E17.089 |
| 2013/0166351 A1* | 6/2013 | Arunachalam ....... G06Q 10/06 |
| | | 705/7.31 |
| 2014/0316888 A1* | 10/2014 | Villars ................. G06Q 50/01 |
| | | 705/14.66 |
| 2015/0178749 A1 | 6/2015 | Meng et al. |
| 2015/0248707 A1 | 9/2015 | Mi et al. |
| 2016/0125456 A1 | 5/2016 | Wu et al. |

* cited by examiner

SYSTEMS AND METHODS FOR TAILORING MARKETING

CROSS-REFERENCE TO RELATED APPLICATION

This application is a continuation of U.S. patent application Ser. No. 16/748,451, entitled "Systems and Methods for Tailoring Marketing" and filed on Jan. 21, 2020, which is a continuation of U.S. patent application Ser. No. 14/961,614, entitled "Systems and Methods for Customized Real Time Data Delivery" and filed on Dec. 7, 2015, which claims the benefit of expired U.S. Provisional Patent Application No. 62/205,580, filed on Aug. 14, 2015, each of which is incorporated by reference as if set forth herein in its entirety.

FIELD

The present disclosure generally relates to customized real time data delivery.

BACKGROUND

With the proliferation of the Internet, as well as the growing popularity of mobile communication devices, marketplaces in which deals (e.g., offers, recommendations, etc.) are exchanged (e.g., purchased, sold, traded, distributed, etc.) have grown over time. This "deals marketplace" has grown quickly, but has encountered a number of challenges. For example, deals are often poorly tailored to consumers (e.g., deals are irrelevant or less relevant to consumers), which may lead many consumers to opt out of receiving such deals and/or a tendency of consumers to "tune out" or ignore deals that are received.

SUMMARY

The systems, methods and computer program products (collectively "system") described herein relate to customized real time data delivery. The system may be configured to receive, by a performance marketing cluster, first data from a first data source. The first data may be at least one of customer data representative of a plurality of customers in response to the first data source being an advertising facilitator, a plurality of offers in response to the first data source being a merchant, or at least one of a plurality of items or a plurality of merchants in response to the first data source being a recommender service. The system may also receive, by the performance marketing cluster, second data from a second data source. The second data may include spend level data. The system may determine, by the marketing cluster, an analysis scheme for the first data and the second data based on the first data source. The system may also determine, by the marketing cluster, at least one of a propensity to act or a recommendation selected from a predefined number of available options for a population based on the analysis scheme and the first data source. The population may include a first member associated with the first data source, a second member associated with the second data source and a third member that is not associated with either the first data source or the second data source.

In various embodiments, the marketing cluster may comprise a plurality of computers arranged for parallel processing. The second data source may be a transaction processor. The transaction processor may be at least one of a transaction account issuer and an acquirer.

The second data may be transaction information from a transaction processor. The transaction information may include purchase data for items.

In various embodiments, the first data may be free of personally identifying information. The second data may also be free of personally identifying information.

In various embodiments the system may also receive, by the performance marketing cluster, third data from a third data source. The third data source may be a data aggregator. The analysis scheme may comprise a first portion and a second portion. The second portion may include adjusting the at least one of the propensity to act and the recommendation for the population based on the third data. The propensity to act may be a score that is used to inform a recommendation.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
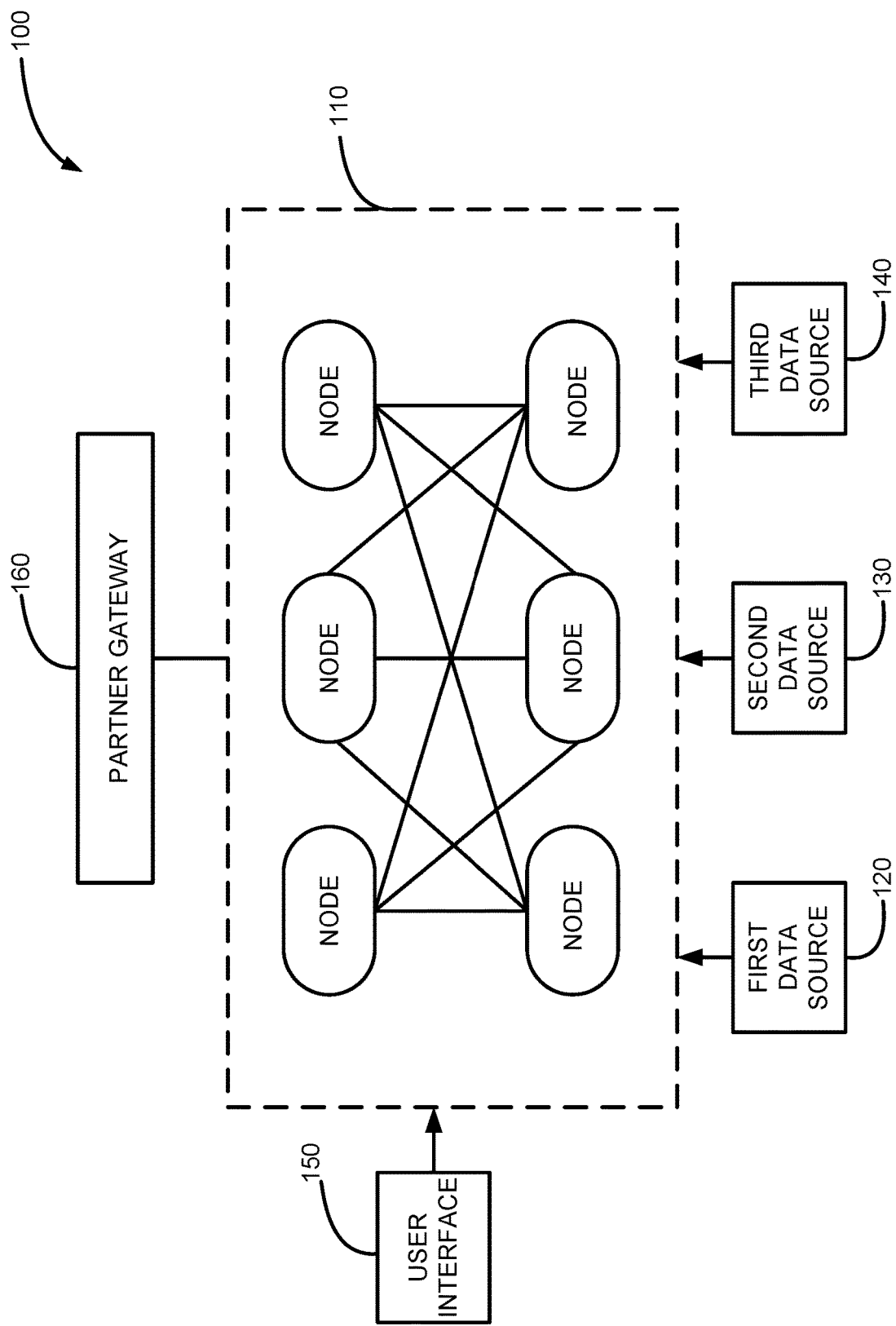
FIG. 1 shows an exemplary system diagram, in accordance with various embodiments.

The present disclosure generally relates to filtering, and more particularly, to tailored marketing to consumers based on filtering. The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, account holder, account affiliate, card member or the like may be used interchangeably and shall include any person, group, entity, business, organization, business, software, hardware, machine and/or combination of these, and may, in various embodiments, be associated with a transaction account, buy merchant offerings offered by one or more merchants using the account and/or be legally designated for performing transactions on the account, regardless of whether a physical card is associated with the account. For example, a consumer or account affiliate may include a transaction account owner, a transaction account user, an account affiliate, a child account user, a subsidiary account user, a beneficiary of an account, a custodian of an account, and/or any other person or entity affiliated or associated with a transaction account.

A bank may be part of the systems described herein, and the bank may, in various embodiments, represent other types of card issuing institutions, such as credit card companies, card sponsoring companies, or third party issuers under contract with financial institutions. It is further noted that other participants may be involved in some phases of a transaction, such as an intermediary settlement institution.

Phrases and terms similar to "business," "merchant," "service establishment," or "SE" may be used interchangeably with each other and shall mean any person, entity, distributor system, software and/or hardware that is a provider, broker and/or any other entity in the distribution chain of goods or services. For example, a merchant may be a grocery store, a retail store, a restaurant, a travel agency, a service provider, an on-line merchant and/or the like. In various embodiments, a merchant may request payment for goods and/or services sold to a customer or consumer who holds an account with a transaction account issuer.

Terms such as "transmit," "communicate" and/or "deliver" may include sending electronic data from one system component to another over a network connection. Additionally, as used herein, "data" may include information such as commands, queries, files, data for storage, and/or the like in digital or any other form.

A "transaction" may include one or more approved authorizations. Moreover, the phrase "transaction data" may comprise data associated with one or more transactions. In various embodiments, an authorization may be approved by a payment processor in response to a transaction request, which may be initiated by a consumer and/or a merchant. Various embodiments may be described with respect to "purchases"; however, the system contemplates any transaction in association with the system.

Phrases and terms similar to "item" may include any good, service, information, experience, data, content, access, rental, lease, contribution, account, credit, debit, benefit, right, reward, points, coupons, credits, monetary equivalent, anything of value, something of minimal or no value, monetary value, offer, merchant, type of merchant, demographic data, preference data, consumer profile data, consumer profile, type of transaction account, transaction account, period of time (e.g., a period of time a consumer has been a customer of a transaction account issuer), size of wallet, share of wallet, information, and/or the like. Further, in various embodiments, an item may comprise an input to and/or an output of a recommendation algorithm.

An "offer" may comprise any data and/or information. An offer may comprise one or more items. In addition, an offer may comprise data associated with one or more items. An offer may further comprise one or more characteristics or metadata. The characteristics or metadata associated with an offer may describe one or more attributes associated with the offer. Further, in various embodiments, an offer may comprise an offer to purchase good or service offered for sale by a merchant or SE. Similarly, in various embodiments, an offer may be associated with a merchant or SE.

A "record of charge" or "ROC" may comprise any transaction, transaction data, a record of a transaction or charge by a consumer with a particular merchant. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction. In various embodiments, a ROC may correspond to an individual transaction. Further, in various embodiments, a ROC may comprise a cumulative value, which may indicate a number of total transactions (e.g., purchases) a consumer has made with a particular merchant. Further still, in various embodiments, a ROC may simply comprise an indication that a consumer has conducted at least one transaction with a merchant (e.g., within a particular time period). For instance, where a consumer's transaction history shows that the consumer has made at least one purchase from a merchant (e.g., within 12 months), a ROC may simply comprise a binary value, such as a "1" or a "yes." Conversely, where a consumer's transaction history indicates that a consumer has not made a purchase from a merchant, a ROC may simply comprise a value such as a "0" or a "no".

In various embodiments, the systems and methods described herein are configured to and/or are capable of tailored marketing, creating real-time predictions, creating forward-looking propensities, and/or determining real-time recommendations or expected behaviors based on diverse and massive data sources that can be analyzed and manipulated in a big data analytical environment or a performance marketing cluster. The systems and methods described herein may be used as part of prospect look-a-like modeling, customer persona modeling, and/or the like. In this regard, the diverse data sources may be analyzed as part of a transfer function that is configured to or capable of predicting the behavior of an unknown customer based on data about the customer matching or being similar to behaviors seen by known customers in the rich data being analyzed in the analytical environment.

Moreover, the modelling by the transfer function may allow for aggregated matching, modeling, and/or recommendations that are independent of a user's affiliation with any particular data set or association with a particular data source. For example, a user need not be associated with and/or have a transaction account or user account associated with the modeler or the performance marketing cluster. In this way, the transfer function can be generally applied for targeting users who are not affiliated with the modeler or the performance marketing cluster.

In various embodiments and with reference to FIG. 1, system 100 may include a performance marketing cluster 110. Performance marketing cluster 110 may be, for example, a big data environment or a Hadoop cluster that is configured to process massive amounts of data from diverse data sources. Performance marketing cluster 110 may be a plurality of high performance computing resources arranged in a distributed array for parallel computing. In this regard, performance marketing cluster 110 may comprise a plurality of data and/or compute nodes arranged in an array and configured for parallel processing of massive amounts of data.

System 100 may also comprise one or more data sources including, for example, a first data source 120, a second data source 130, a third data source 140, and/or the like. First data source may be any suitable data source including, for example, partner data. This first data source 120 may be referred to as first party data. The first party data may generally identify (e.g., without any personally identifying information) and/or quantify one or more particular users of a partner system. This first party data from first data source 120 may be data that is analyzed in performance marketing cluster 110. The first party data may be used to identify recommendations or propensities for each of the particular customers associated with the first party data. Moreover, the first party data may be provided by any other suitable party and may be any other suitable data including, for example, transaction data, demographic data, spend information, location information, temporal information, and/or the like.

System 100 may further comprise and/or receive second party data from second data source 130. Second party data may be enriched data that accurately models and/or reflects particular types of customers' propensity to carry out particular actions based on actual actions detected by those customers. The second party data from second data source 130 may be agnostic as to any particular person. In this regard, second party data may be stripped of any personally identifying information. Moreover, second party data may be provided by a transaction account issuer or a transaction processor. The second party data may be used by performance marketing cluster 110 to accurately model one or more users' propensity to carry out an action based on an interaction with other data, an advertisement, a recommendation, and/or the like. Moreover, the second party data may contain particular purchases, spend level data, and/or actions that predict activities associated with similarly situated users.

Third data source 140 may provide third party data such as, for example, data that is more generalized demographic information. The data may also be available from a public source. Third party data source 140 may include, for example, social media channel data, demographic data, temporal data, and/or the like. Third data source may include, for example, a data aggregator, a social media channel, InfoBase, data products, and/or the like. In this regard, the data from third data source 140 may be configured as baseline data that generally models the demographic and distribution of behaviors over a class of consumers such as for example, children, single adults, consumer of particular types and/or classes or products, households with a particular range of income, and/or the like.

In various embodiments, system 100 may comprise a user interface 150. User interface 150 may provide an operator of performance marketing cluster 110 with access to performance marketing cluster 110. More specifically, user interface 150 may provide a user with access to an analytical environment, a production environment, and/or a real-time production environment within performance marketing cluster 110. Moreover, user interface 150 may provide a user with access to various data ingestion engines, various matching engines, and various data storage databases and/or the like. These data storage databases may include, for example, data from first data source 120, data from second data source 130, data from third data source 140, and/or the like. User interface 150 may also be configured with various controls and/or inputs that allow an operator of performance marketing cluster 110 to manipulate the analytical environment, production environment, real-time production environment, and/or the like.

In various embodiments, system 100 may also comprise a partner gateway 160. Partner gateway 160 may be an API or similar interface. Partner gateway 160 may be configured to pass data between a partner and performance marketing cluster 110. More specifically, and, for example, partner gateway 160 may be configured to receive outputs from the production environment and/or real-time production environment within performance marketing cluster 110. These outputs may include for example propensities to carry out a particular activity, recommendations, and/or other similar data that may be used to inform the data presented by the partner to a user.

In various embodiments, performance marketing cluster 110 may be configured to build and/or manipulate the transfer function. The transfer function may be built based on second party rich data (e.g., spend level data and/or transaction data) provided by a transaction account issuer, a transaction processor, and/or the like. The transfer function may be used to analyze and provide recommendations or propensities based on the first party data from first data source 120 and third party data from third data source 140.

In various embodiments, the transfer function may be configured to output defined dependent variables and predicted dependent variables, which then may be passed to a partner through partner gateway 160 to inform the partner's predictive modeling capabilities or as recommendations that may be passed along to the partner's users based on the analysis conducted by performance marketing cluster 110. Performance marketing cluster 110 may be configured to analyze, carry out, and/or otherwise work the transfer function on any suitable timeframe. In this regard, performance marketing cluster 110 may be able to influence data presented to a user via partner gateway 160 in real-time or in substantially real-time based on the location of a user, the location of a merchant associated with a user, temporal information surrounding the user (e.g., the date, the time of day, weather conditions, and/or the like), and/or any other suitable real-time data received by performance marketing cluster 110 through any one of first data source 120, second data source 130, and/or third data source 140, and/or the like.

Figure 2:
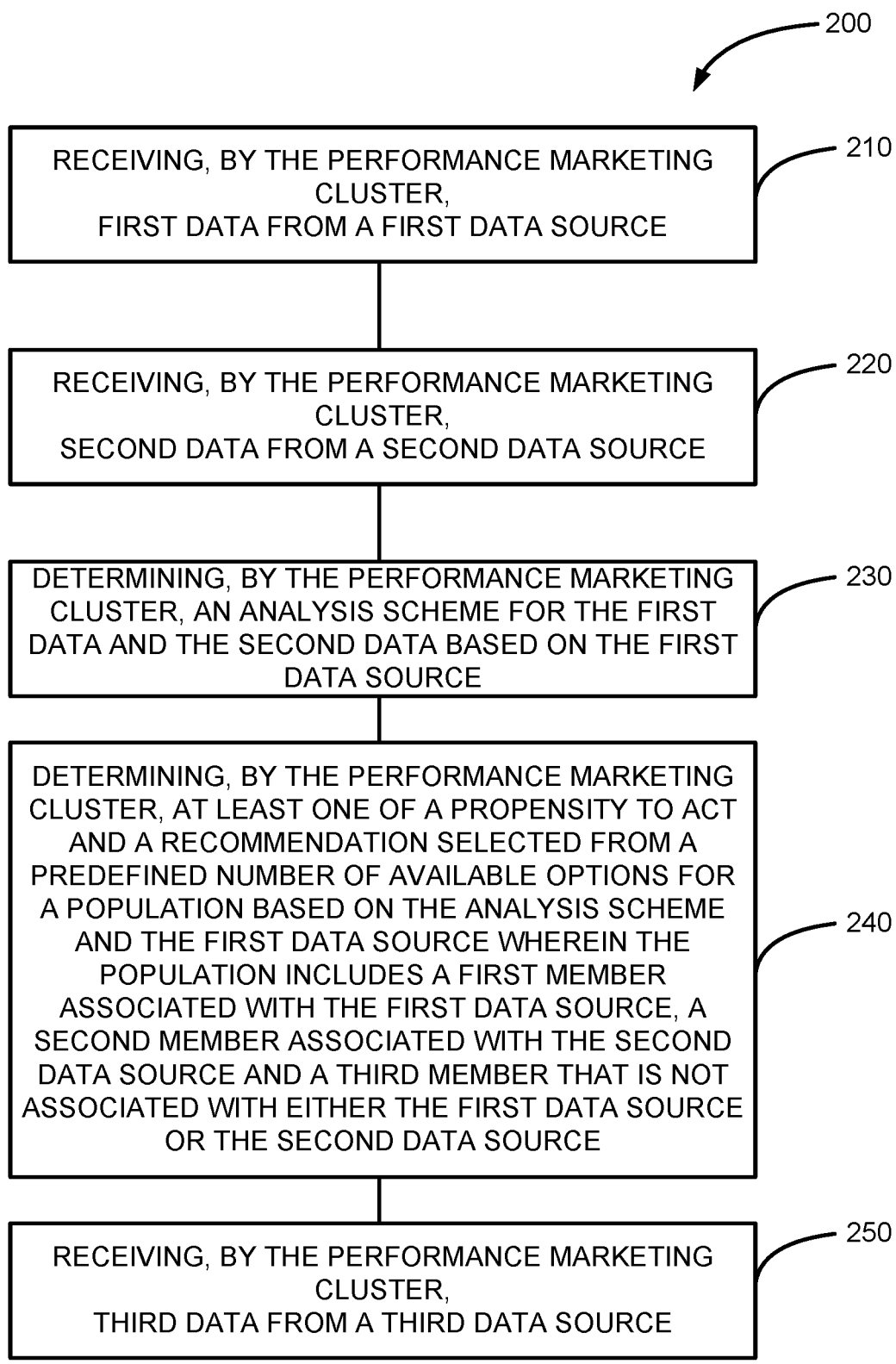
FIG. 2 shows a flowchart depicting an exemplary process for tailoring a propensity to act or a recommendation, in accordance with various embodiments.

In various embodiments, and with reference to FIG. 2, system 100 may be configured to carry out and/or conduct a method 200. Method 200 may include steps and/or operations comprising receiving, by performance marketing cluster 110, first data from a first data source 120 (Step 210). The first data may be agnostic customer data representative of a plurality of customer in response to first data source 120 being and advertising facilitator. In this regard, the first data may be free of personally identifying information as discussed herein. The first data may also be a plurality of offers in response to first data source 120 being a merchant. The first data may be at least one of a plurality of items or a plurality of merchants in response to first data source 120 being a recommender service.

In various embodiments, method 200 may include steps and/or operations comprising receiving, by the performance marketing cluster 110, second data from second data source 130 (Step 220). Second data may include spend level and/or transaction data (e.g., purchase data for items). The second data may also be free of personally identifying information as discussed herein. In this regard, the second data source 130 may be a transaction processor and/or third party operator of a rewards program or similar service that is configured to receive transaction information from a payment network based on an opt-in from a customer and/or the like.

In various embodiments, method 200 may include steps and/or operations comprising determining, by the marketing cluster 110, an analysis scheme for the first data and the second data based on the first data source 120 (Step 230). The analysis scheme may be any suitable scheme with one or more portions that are triggered in response to data from first data source 120, second data source 130, and/or third data source 140.

In various embodiments, method 200 may include steps and/or operations comprising determining, by the marketing cluster 110, at least one of a propensity to act and a recommendation for a population based on the analysis scheme and first data source 120 (Step 240). For example, the propensity to act may be a score that can be used by a partner to further refine and/or identify tailored content for a customer or a recommendation. The recommendation may be a recommendation of an item or merchant. The recommendation may also be a selection of content (e.g., an offer, an advertisement, and/or the like) from a pool of content that is most appropriate and/or most relevant to a user or scenario. For example, the population may include one or more first member associated with the first data source 120, one or more second members associated with the second data source 130, and a third member that is not associated with either the first data source or the second data source. The population may also include one of more members associated with third data source 140.

In various embodiments, method 200 may include steps and/or operations comprising receiving, by performance marketing cluster 110, third data from third data source 140 (Step 250). Third data source is a data aggregator. The data aggregator may be any suitable data source including for example, a social media channel, a commercial data aggregator, a streaming data source and/or the like. In this regard, the data aggregator may be configured to provide real-time and/or batch data based on a suitable request from performance marking cluster 110.

In various embodiments, the analysis scheme may comprises a first portion and a second portion. The second portion of the analysis scheme may include adjusting the at least one of the propensity to act and the recommendation for the population based on the third data form third data source 140. In this regard, the channel associated with third data source 140 may act to supplement the base of consumers that are analyzed by the analysis scheme.

A "channel" may include any system or method for delivering content and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe pdf document, etc.), an "ebook," an "emagazine," an application or micro-application (as described herein), a text message, an email, and/or the like. In various embodiments, a channel may be hosted or provided by a data partner. Further, in various embodiments, a channel may comprise a social media channel, such as FACEBOOK, FOURSQUARE, TWITTER, and/or the like.

A "consumer profile" or "consumer profile data" may comprise any information or data about a consumer that describes an attribute associated with the consumer (e.g., a preference, an interest, demographic information, personally identifying information, and/or the like). In various embodiments, a consumer profile may be based upon a variety of data. For example, a consumer profile may be based upon data that is received, culled, collected, and/or derived from a variety of sources, such as a consumer's transaction history, data associated with or available via a consumer's social networking profile (e.g., a consumer's FACEBOOK profile), data associated with a customer's physical location, and/or other publicly and/or privately available sources of information about a consumer. In various embodiments, a consumer profile may not be based upon such data, unless a consumer opts in or requests that such data be used.

Further, in various embodiments, a consumer profile may be based upon data contributed by a consumer, a merchant, a third party, and/or an SE (as described herein). Such data may comprise, for example, a consumer's personal information, e.g., demographic information, a consumer's date of birth, a consumer's residence information, an address of the consumer's work, a specific preference associated with the consumer (e.g., a preference for a certain type of vacation, such as a preference for a tropical vacation), a website in which the consumer is interested, and/or the like. Further, a consumer may contribute data towards a consumer profile by way of a form and/or questionnaire, such as, for example, a web-based form or questionnaire.

With further regard to the types of data which may be contributed to a consumer profile, in general, any information that a consumer would like to serve as a basis for a consumer profile may be contributed. For instance, a consumer profile may comprise location data (e.g., data associated with a global positioning system, a home address, a work address, family location data, data about a consumer's most shopped or favorite shopping locations, data about a consumer's most visited or favorite places), data associated with a consumer's favorite websites, digital destinations, or magazines (e.g., blogs, news websites, shopping websites, research websites, financial websites, etc.), personal data (e.g., email addresses, physical addresses, phone numbers, age information, income information, expenses information, etc.), data associated with a consumer's status or mode of travel (e.g., vacation data, business data, personal data, airline data, lodging data, etc.), data associated with a consumer's favorite items (e.g., food, restaurants, groceries, electronics, music, gaming, clothing types, hobbies, fitness, etc.), and/or the like.

In addition, in various embodiments, a consumer profile may include online tracking cookie data, web beacon data, web tracking data, web packet trace data, digital fingerprint data, clickstream data, purchase or transaction history data, data entered by a consumer in a web based form, data purchased by a merchant about a consumer, social networking data, banking and/or credit card data, stock keeping unit ("SKU") data, transactional and/or budget data, coupon data, retail data (e.g., items purchased, wish lists, etc.), data from third party personal data aggregators, search engine data, and/or any other data which the merchant may have in its possession or to which the merchant may gain access.

In various embodiments, a consumer may specify that a consumer profile may be based upon certain data, but that the profile should not be based upon other data. For example, a consumer may specify that the consumer's profile may be based upon data associated with the consumer's transaction history, but may not be based upon data culled from the consumer's social networking profile.

Phrases and terms similar to "account," "transaction account," "account," "account number," "account code," and/or "consumer account" may include any account that may be used to facilitate a transaction (e.g., financial transaction). These accounts may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card and/or an associated account.

Further, the phrase "size of wallet" may refer to a consumer's or business' total aggregate spending. Likewise, as used herein, the phrase "share of wallet" may represent how a customer uses different payment instruments. A size of wallet and a share of wallet may, for example, be determined as described in U.S. patent application Ser. No. 10/978,298 filed, Oct. 29, 2004, and entitled Method and Apparatus for Estimating the Spend Capacity of Consumers, which is incorporated herein by reference in its entirety for all purposes.

In general, although embodiments are described with additional detail herein, an item may be tailored to a consumer based upon a recommendation algorithm. In various embodiments, the recommendation algorithm may identify items that are relevant to one or more consumers. For example, the recommendation algorithm may assign a score to one or more items, where the score may be based on information such as a consumer profile, a transaction history associated with a consumer, social data (e.g., data associated with a social media channel, such as FOURSQUARE, FACEBOOK, TWITTER, and/or the like), demographic data, clickstream data, consumer feedback data, and/or the like. Thus, a score may identify relevant items based upon a variety of information associated with a consumer.

Moreover, in various embodiments, an item may be tailored to a consumer based on a merchant's needs (e.g., that the merchant is interested in rewarding existing loyal customers and/or that the merchant would like to acquire new customers). Further still, in various embodiments, an item may be tailored to a particular consumer based upon a business rule, such as, for example, that it is a holiday, that it is a particular time of day, that the consumer is traveling, that the item is associated with a merchant who is some distance away and/or near to from the consumer's location, that the consumer has indicated a preference not to receive the item (e.g., the consumer has given the item a "thumbs down"), and/or the like.

In operation, social data may be used to determine how an item is displayed to a consumer or to modify a predetermined ranking. For example, an offer presented through FACEBOOK may comprise or be associated with criteria (e.g., keywords, metadata, and/or the like). Social data from FACEBOOK may be captured and compared to the criteria. Where there is a match or association between the criteria and the social data, the offer may be ranked higher, associated with a higher rank (e.g., higher number) or displayed more prominently based on the match or association. Business rules may be employed to define how a match or association is determined. The business rules may include that the social data partially match or associate with the criteria. The business rules may include that the social data exactly match or associate with the criteria. An exact match or association may be used to adjust the ranking of an offer (where the offer was previously ranked based on other data associated with the customer) to ensure that the social data adjusts the ranking in a manner that is relevant and desirable for the customer.

For example, company A may have a FACEBOOK page that a customer can "like." Another party may also have a FACEBOOK page that is critical of company A that a customer can "like." If the customer "likes" company A's FACEBOOK page, that social data may be used to promote or adjust the rankings of an offer from company A based on the direct match. However, if the customer "likes" the FACEBOOK page that is critical of company A, the social data may be ignored with respect to the ranking of an offer from company A or may be used to lower the ranking of the offer from company A.

Rankings of offers may also be adjusted based on other types of social data such as customer broadcasts. For example, a customer using TWITTER may broadcast tweets comprising hashtags and/or any other identifiers or keywords. The hashtag, identifier, and/or keyword data may be captured (e.g., via an API interfacing with Twitter, or being on a Twitter distribution list) and used to adjust offers associated with the hashtag, identifier, and/or keyword. The hashtag, identifier, and/or keyword data may be compared to criteria associated with the offer. The hashtag, identifier, and/or keyword data may also be evaluated to identify a customer's interests, hobbies, and/or preferences. This knowledge of the customer may affect the ranking of particular offers associated with any interest, hobby, or preference (e.g., if an offer is relevant to a particular customer, the ranking of the offer may be increased).

As discussed briefly above, the data upon which a preference is based may be variously determined. For instance, a preference may be based, in various embodiments, upon transaction data, which may include, for example, one or more industry codes (e.g., standard industry codes or SIC codes) associated with one or more transactions. Similarly, a preference may be based upon one or more groups of similar items (e.g., merchants), a mapping of third party data associated with one or more items to internal data (as discussed herein), a consumer profile (as discussed above), and/or the like. Further, as discussed herein, data such as transaction data, social data, time and/or date information, consumer and/or merchant feedback, and/or the like, may serve as a basis for determining a preference.

A merchant status may be based upon transaction data or ROC data. For instance, a merchant status may be based upon one or more ROCs associated with a merchant (e.g., purchases by customers from the merchant). Further, a merchant status may be based upon ROC data during a period of time, e.g., one month, several months, one year, and/or the like. For example, in various embodiments, a merchant status may be based upon a comparison of a number of days since a last ROC associated with a merchant ("X") to a maximum number of consecutive days (e.g., in a period of time) during which a merchant was not associated with a ROC ("Y") (e.g., the merchant made no sales to customers of a transaction account provider). Specifically, a merchant status may be based upon comparison of a number of days between a ROC associated with a merchant and a current date ("X") to a number of consecutive days during which the merchant was not associated with a ROC ("Y").

In various embodiments, a consumer may "check in" or "log in" at a location, such as a merchant location. For example, a consumer may check in via a web client, mobile device and/or mobile application, which may include a global positioning system or the like. Similarly, in various embodiments, a transaction by a consumer may automatically check a consumer into a merchant location associated with the transaction. Further, in various embodiments, one or more consumers may check into one or more locations, and the consumers may share these locations with one or more other consumers. For example, where a group of consumers are members of a social network and/or associated with one another via a social network, each consumer may be allowed to access one or more locations associated with members of the social network. That is, a consumer may review merchant locations where members of their social network have checked in. A consumer may review merchant locations associated with other members of their social network via, for example, one or more of web client 112, a social media website, a merchant website, a financial institution website, a mobile device application, and/or the like.

With more particular regard now to transaction based check in (i.e., check in based upon a location of a consumer and/or a consumer's web client), in various embodiments, system 100 may analyze transaction data to verify that a consumer has conducted a transaction at a specific merchant location. For instance, a transaction may verify a consumer's presence at a merchant location, and may also serve to check or log the consumer in at the merchant location. In various embodiments, a zero value transaction may suffice to check a consumer in at a merchant location. A zero value transaction may comprise a transaction associated with zero monetary value, or in other words, a transaction in which a consumer is not charged. Likewise, in various embodiments, a consumer may be credited past check-ins based on the transaction history of the consumer. Thus, transaction based check in may encompass both transactions associated with a value or charge as well as transactions associated with no value or charge.

With continuing attention to transaction based check in, a consumer may be checked in based upon both of a card present and a card not present transaction. As used herein, a consumer may present a transaction instrument to a merchant as part of a card present transaction. Conversely, as used herein, a consumer may not present a transaction instrument to a merchant as part of a card not present transaction. Rather, a consumer may present a transaction account number to facilitate a card not present transaction. Card not present transactions are common types of online transactions. Further, in various embodiments, a consumer may be checked in based upon internal and/or external (e.g., third party) data.

A transaction based check in may occur in real time (e.g., at substantially the same time as a transaction), or it may occur at a later time. In various embodiments, a transaction based check in may be further confirmed by verifying a location of web client 112 associated with a consumer (e.g., via a global positioning system associated with web client 112). This may be referred to as location based check in. Thus, in certain embodiments, a transaction based check in may be utilized, while other embodiments may utilize a location based check in. Likewise, as discussed, in various embodiments, both of a transaction based check in and a location based check in may be employed.

A consumer may receive notification of a successful (or unsuccessful) check-in. This may occur, in various embodiments, in response to a transaction authorization. Similarly, a merchant may receive information related to consumers who have checked in with the merchant. In various embodiments, a merchant may receive aggregated check in information (e.g., a number of check-ins) but may not receive individual check in notifications. However, a merchant may also receive individual check-in data.

In various embodiments, a consumer may be offered a reward as an incentive to visit (and/or check in with) a merchant. Likewise, in various embodiments, a consumer may keep track of one or more merchants visited or checked in by the consumer. A reward may be monetary, status-based, reputation-based, etc. A reward may incentivize a consumer and/or other consumers to visit a merchant. For example, a reward may incentivize a consumer who receives a reward to return to the merchant. A reward may also incentivize members of a consumer's social network (who may have access to the consumer's check in data, as discussed above) to visit a merchant as well. In various embodiments, a consumer may be rewarded for checking in with a merchant a certain number of times, and/or a consumer may be rewarded for checking in with one or more merchants.

In various embodiments, a group of merchants comprising a list may be output by system 100 as a result of an algorithm (and/or one or more other processes), as described herein. Thus, in various embodiments, one or more merchants comprising a list may be tailored to a consumer as discussed herein.

In various embodiments, a reward may vary in response to a consumer's actions. For example, a consumer may complete a greater number of lists in order to receive a greater number of rewards and/or rewards of greater value. Similarly, a consumer may complete a difficult list (e.g., a list that is longer than another list) to obtain a more desirable reward. Further, a reward may vary based on a size of wallet (as discussed herein) of a consumer. For instance, a consumer associated with a particular size of wallet may have credit sufficient to check in with a list of luxury merchants. In return, such a consumer may receive a high value or luxury reward.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor;

and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and/or the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other sub sets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and/or the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the interne. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and/or the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and/or the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

With further regard to terms such as "consumer," "customer," "merchant," and/or the like, each of these participants may be equipped with a computing device in order to interact with the system and facilitate online commerce transactions. A consumer or customer may have a computing unit in the form of a personal computer, although other types of computing units may be used including laptops, notebooks, hand held computers, set-top boxes, cellular telephones, touch-tone telephones and/or the like. A merchant may have a computing unit implemented in the form of a computer-server, although other implementations are contemplated by the system. A bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein A merchant computer and/or a bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

An electronic commerce system may be implemented at the customer and issuing bank. In an exemplary implementation, the electronic commerce system may be implemented as computer software modules loaded onto the customer computer and the banking computing center. The merchant computer may not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and/or the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 10.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "internal data" or "closed loop data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A computer-implemented method comprising:
   receiving, by a computing device, a first set of data from a first source and a second set of data from a second source, the first set of data comprising a plurality of items available from the first source for a first set of users and the second set of data comprising transaction purchase data for a second set of users that have reward accounts;
   utilizing, by the computing device, a predictive data model that determines a propensity score for a user from only behavior data that is not attributed to the user, the behavior data comprising the second set of data, wherein the user is absent from the second set of users and the propensity score represents a likelihood that the user will act on a recommendation or an offer for one or more of the plurality of items from the first source;
   receiving, by the computing device, a third set of data from a third source, the third set of data comprising social media channel data for a third set of users, wherein the third set of users are absent from the second set of users;
   updating, by the computing device, the predictive data model to determine the propensity score for the user based at least in part on the third set of data;
   generating, with the predictive data model by the computing device, the propensity score for the recommendation or the offer for the user; and
   providing, over a computing network, a graphical user interface to the user having the recommendation or the offer in response to the propensity score meeting or exceeding a predefined threshold, wherein a positioning of the recommendation or the offer in the graphical user interface with respect to another recommendation or another offer in the graphical user interface is determined based on social media channel data of the user.

2. The computer-implemented method of claim 1, wherein generating the propensity score for the recommendation for the user further comprises:

identifying, by the computing device, a plurality of users in the second set of data, individual ones of the plurality of users having a first behavior similar to a second behavior of the user; and wherein the propensity score is generated based at least in part on a degree of similarity between the first behavior and the second behavior.

3. The computer-implemented method of claim 1, wherein generating the propensity score for the recommendation for the user further comprises:

identifying, with the predictive data model by the computing device, a predefined dependent variable based at least in part on an analysis of the first set of data or the second set of data; and wherein the propensity score is generated based at least in part on the predefined dependent variable.

4. The computer-implemented method of claim 1, wherein generating the propensity score for the recommendation for the user further comprises:

identifying, with the predictive data model by the computing device, a predicted dependent variable based at least in part on an analysis of the first set of data or the second set of data; and wherein the propensity score is generated based at least in part on the predicted dependent variable.

5. The computer-implemented method of claim 1, wherein the behavior data for the second set of users represents whether individual ones of the second set of users has one or more purchase transactions involving one or more of the plurality of items available from the first source.

6. The computer-implemented method of claim 1, further comprising capturing, by an application programming interface (API) that interfaces a social media website or application, the social media channel data of the user.

7. The computer-implemented method of claim 6, wherein the social media channel data of the user comprises broadcast posts by the user.

8. A system comprising:

a computing device comprising a processor and a memory; and machine-readable instructions stored in the memory that, when executed by the processor, cause the computing device to at least:

receive a first set of data from a first source and a second set of data from a second source, the first set of data comprising a plurality of items available from the first source for a first set of users and the second set of data comprising transaction purchase data for a second set of users that have reward accounts;

utilize a predictive data model that determines a propensity score for a user from only behavior data that is not attributed to the user, the behavior data comprising the second set of data, wherein the user is absent from the second set of users and the propensity score represents a likelihood that the user will act on a recommendation or an offer for one or more of the plurality of items from the first source;

receive a third set of data from a third source, the third set of data comprising social media channel data for a third set of users, wherein the third set of users are absent from the second set of users;

update the predictive data model to determine the propensity score for the user based at least in part on the third set of data;

generate, with the predictive data model, the propensity score for the recommendation or the offer for the user; and provide, over a computing network, a graphical user interface to the user having the recommendation or the offer in response to the propensity score meeting or exceeding a predefined threshold, wherein a positioning of the recommendation or the offer in the graphical user interface with respect to another recommendation or another offer in the graphical user interface is determined based on social media channel data of the user.

9. The system of claim 8, wherein the machine-readable instructions that cause the computing device to generate, with the predictive data model, the propensity score for the recommendation for the user further cause the computing device to at least:

identify a plurality of users in the second set of data, individual ones of the plurality of users having a first behavior similar to a second behavior of the user; and wherein the propensity score is generated based at least in part on a degree of similarity between the first behavior and the second behavior.

10. The system of claim 8, wherein the machine-readable instructions that cause the computing device to generate, with the predictive data model, the propensity score for the recommendation for the user further cause the computing device to at least:

identify, with the predictive data model, a predefined dependent variable based at least in part on an analysis of the first set of data or the second set of data; and wherein the propensity score is generated based at least in part on the predefined dependent variable.

11. The system of claim 8, wherein the machine-readable instructions that cause the computing device to generate, with the predictive data model, the propensity score for the recommendation for the user further cause the computing device to at least:

identify, with the predictive data model, a predicted dependent variable based at least in part on an analysis of the first set of data or the second set of data; and wherein the propensity score is generated based at least in part on the predicted dependent variable.

12. The system of claim 8, wherein the behavior data for the second set of users represents whether individual ones of the second set of users has one or more purchase transactions involving one or more of the plurality of items available from the first source.

13. The system of claim 8, wherein the machine-readable instructions further cause the computing device to capture, using an application programming interface (API) that interfaces a social media website or application, the social media channel data of the user.

14. The system of claim 13, wherein the social media channel data of the user comprises broadcast posts by the user.

15. A non-transitory, computer-readable medium comprising machine-readable instructions that, when executed by a processor, cause a computing device to at least:

receive a first set of data from a first source and a second set of data from a second source, the first set of data comprising a plurality of items available from the first source for a first set of users and the second set of data comprising transaction purchase data for a second set of users that have reward accounts;

utilize a predictive data model that determines a propensity score for a user from only behavior data that is not attributed to the user, the behavior data comprising the second set of data, wherein the user is absent from the second set of users and the propensity score represents a likelihood that the user will act on a recommendation or an offer for one or more of the plurality of items from the first source;

receive a third set of data from a third source, the third set of data comprising social media channel data for a third set of users, wherein the third set of users are absent from the second set of users;

update the predictive data model to determine the propensity score for the user based at least in part on the third set of data;

generate, with the predictive data model, the propensity score for the recommendation or the offer for the user; and provide, over a computing network, a graphical user interface to the user having the recommendation or the offer in response to the propensity score meeting or exceeding a predefined threshold, wherein a positioning of the recommendation or the offer in the graphical user interface with respect to another recommendation or another offer in the graphical user interface is determined based on social media channel data of the user.

16. The non-transitory, computer-readable medium of claim 15, wherein the machine-readable instructions that cause the computing device to generate, with the predictive data model, the propensity score for the recommendation for the user further cause the computing device to at least:

identify a plurality of users in the second set of data, individual ones of the plurality of users having a first behavior similar to a second behavior of the user; and wherein the propensity score is generated based at least in part on a degree of similarity between the first behavior and the second behavior.

17. The non-transitory, computer-readable medium of claim 15, wherein the machine-readable instructions that cause the computing device to generate, with the predictive data model, the propensity score for the recommendation for the user further cause the computing device to at least:

identify, with the predictive data model, a predefined dependent variable based at least in part on an analysis of the first set of data or the second set of data; and wherein the propensity score is generated based at least in part on the predefined dependent variable.

18. The non-transitory, computer-readable medium of claim 15, wherein the machine-readable instructions that cause the computing device to generate, with the predictive data model, the propensity score for the recommendation for the user further cause the computing device to at least:

identify, with the predictive data model, a predicted dependent variable based at least in part on an analysis of the first set of data or the second set of data; and wherein the propensity score is generated based at least in part on the predicted dependent variable.

19. The non-transitory, computer-readable medium of claim 15, wherein the behavior data for the second set of users represents whether individual ones of the second set of users has one or more purchase transactions involving one or more of the plurality of items available from the first source.

20. The non-transitory, computer-readable medium of claim 15, wherein the machine-readable instructions further cause the computing device to capture, using an application programming interface (API) that interfaces a social media website or application, the social media channel data of the user.

\* \* \* \* \*